United States Patent
Bae

[19]

[11] Patent Number: 6,126,604

[45] Date of Patent: Oct. 3, 2000

[54] ULTRASONIC COLOR FLOW MAPPING (CFM) SYSTEM AND ULTRASONIC DOPPLER SIGNAL FILTERING METHOD

[75] Inventor: Moo-Ho Bae, Seoul, Rep. of Korea

[73] Assignee: Medison Co., Ltd., Kangwon-do, Rep. of Korea

[21] Appl. No.: 09/148,036

[22] Filed: Sep. 3, 1998

[30] Foreign Application Priority Data

Sep. 4, 1997 [KR] Rep. of Korea ...................... 97-45844

[51] Int. Cl.[7] .................................................. A61B 08/00
[52] U.S. Cl. .......................................................... 600/454
[58] Field of Search ................................... 600/454, 455, 600/457, 456, 443

[56] References Cited

U.S. PATENT DOCUMENTS

| | | | |
|---|---|---|---|
| 4,993,417 | 2/1991 | Seo | 600/455 |
| 5,188,113 | 2/1993 | Sato et al. | 600/455 |
| 5,249,578 | 10/1993 | Karp et al. | 600/443 |
| 5,311,870 | 5/1994 | Fukukita et al. | 600/455 |
| 5,483,964 | 1/1996 | Amemiya et al. | 600/455 |

*Primary Examiner*—Marvin M. Lateef
*Assistant Examiner*—Moulin Patel
*Attorney, Agent, or Firm*—F. Chau & Associates, LLP

[57] ABSTRACT

An ultrasonic color flow mapping system and a filtering method for filtering an ultrasonic Doppler signal are provided. The ultrasonic color flow mapping system includes a forward processing portion for excluding initial output data up to a predetermined number from outputs based on an ultrasonic Doppler signal input having a predetermined index sequence, a backward processing portion for excluding initial output data up to a predetermined number from outputs based on the ultrasonic Doppler signal input having a backward index sequence with respect to the input of the forward processing portion, and an operator for calculating a power and an average frequency of the ultrasonic Doppler signal based on the outputs of the forward and backward processing portions and providing the calculated result as an output for image regeneration. As a result, a transient response with respect to a low-frequency signal contained in the ultrasonic Doppler signal can be minimized and an image such as a blood stream velocity can be accurately regenerated in real time.

9 Claims, 2 Drawing Sheets

ULTRASONIC COLOR FLOW MAPPING (CFM) SYSTEM AND ULTRASONIC DOPPLER SIGNAL FILTERING METHOD

BACKGROUND OF THE INVENTION

1. Field of the Invention

The present invention relates to an ultrasonic color flow mapping system and a method for filtering an ultrasonic Doppler signal.

2. Description of the Related Art

With the development of electronics, an ultrasonic diagnostic system which is widely used in a general medical treatment has been remarkably improved in its performance and thus plays a role of an auxiliary stethoscope. In principle, the ultrasonic diagnostic method uses an acousto-physical response or acousto-physical information of a living organism texture such as reflection, scattering and absorption occurring when an ultrasonic wave passes through the living organism texture.

A Doppler method has been proposed as a method for realization of an ultrasonic scanned signal as an image. A diagnostic apparatus adopting the Doppler method displays a frequency shift amount together with a signal scattering intensity as images, to thereby estimate the circulation of blood in the living body. However, such a conventional diagnostic apparatus cannot but obtain only blood stream information of a constant depth according to the beam direction.

Thus, the Doppler video system capable of displaying a color image demodulates a received signal and then digitizes the demodulation signal for processing, which can provide an excellent effect in which a blood stream flowing in the heart or a main blood vessel can be described as a two-dimensional (2D) image. The color Doppler video system can display both tomogram and blood stream information. To identify the tomogram and the blood stream information with each other, the color Doppler video system displays the tomogram as monochrome and the blood stream information as color. In this case, the information of the blood stream flowing toward the direction of the scanned ultrasonic beam is displayed as the warm color and that of toward the counter-direction thereof is displayed as the cool color. Accordingly, the information of the blood stream can be displayed more accurately.

Meanwhile, the Doppler signal having demodulated by the above color Doppler video system contains a signal from a feeble blood stream having a relatively high frequency and a relatively small magnitude, and a signal from a soft texture having a relatively low frequency and a relatively large magnitude. In general, the former is called a Doppler signal and the latter is called a clutter signal. Here, a low-frequency signal, that is, a clutter signal impedes an accurate detection of the blood stream information. Thus, to accurately detect the blood stream information, the clutter signal should be properly removed. The clutter signal contains a very large direct-current (DC) component in general, and has several hundred times an amplitude as large as that of the Doppler signal, which has a bad influence upon an accurate image regeneration, as will be described later. For this reason, the color Doppler video system uses a moving target indicator (MTI) filter being a kind of a high-pass filter, to remove such a clutter signal.

The MTI filter is a filter applied from the principle of an MTI radar, which is divided into an infinite impulse response (IIR) filter and a finite impulse response (FIR) filter. The FIR filter adopts a relatively simple hardware structure and possesses a high stability with respect to a coefficient variation, with no transient phenomena, when compared with the IIR filter. However, since the FIR filter has a very sluggish frequency characteristic curve, it is not so easy to determine a cut-off frequency necessary for removing the clutter signal. In comparison, the IIR filter of the low degree can obtain a desired steep frequency characteristic curve relatively easily, which causes it to be widely used in real implementation.

FIG. 1 is a block diagram showing a conventional ultrasonic color flow mapping system. As can be seen in the drawing, the conventional ultrasonic color flow mapping system includes a plurality of two-dimensional (2D) IIR filters 11 through 14, an auto-correlation estimator 15 and a look-up table 16. The video system uses N sequential complex variables I(n) and Q(n) in which n=0, 1, ..., N−1 of a practical data set as inputs, in order to calculate an average velocity and power of the blood stream. Here, assuming that the inputs of the 2'nd order IIR filters 11 through 14 are denoted as x(n) and the outputs thereof are denoted as y(n), an input and output relationship is represented by the following equation (1).

$$y(n)=\alpha_0 x(n)+\alpha_1 x(n-1)+\alpha_2 x(n-2)-\beta_1 y(n-1)-\beta_2 y(n-2) \quad (1)$$

Here, $\alpha_0, \alpha_1, \alpha_2, \beta_1$ and $\beta_2$ are filter coefficients which are variables properly set according to the characteristic of the filter. Here, in the case when it is defined that n=0, 1, ..., N−1, a transient response with respect to the clutter signal which is removed by filtering it according as how x(−1), x(−2), y(−1) and y(−2) are defined, can be varied.

Meanwhile, the auto-correlation output of the auto-correlation estimator 15 according to the inputs I2(n) and Q2(n) in FIG. 2 is defined as the following equation (2).

$$R(0) = \sum_{n=0}^{N-1} (I2(n) \cdot I2(n) + Q2(n) \cdot Q2(n)) \quad (2)$$

$$\text{Re}(R(1)) = \sum_{n=0}^{N-2} (I2(n) \cdot I2(n+1) + Q2(n) \cdot Q2(n+1))$$

$$\text{Im}(R(1)) = \sum_{n=0}^{N-2} (I2(n) \cdot Q2(n+1) - Q2(n) \cdot I2(n+1))$$

Here, the auto-correlation R(0) from the auto-correlation estimator 15 is contributed for calculating the power of the Doppler signal and the auto-correlations Re(R(1)) and Im(R(1)) are contributed for calculating the average frequency of the Doppler signal through the look-up table 16.

However, the color Doppler video system for the abdomen generally uses N of eight through 16, in order to calculate the average velocity and the power of the blood stream with respect to the pixel. Accordingly, although filtering is performed using the IIR filter, a transient response with respect to a feeble clutter signal still remains. Also, since the clutter signal is greater than the Doppler signal by 40 through 50 dB, even a transient response with respect to the clutter signal can have a bad influence upon calculation of the blood stream velocity.

Thus, various studies are under progress in order to reduce the effect of a transient response with respect to the clutter signal. Recently, a method for calculating a blood stream velocity after excluding several initial output data which can have a comparatively big influence upon the transient response among the filtered outputs, has been proposed.

According to this method, in the FIG. 1 technology, the indices of the outputs I1(n) and Q1(n) with respect to the inputs I(n) and Q(n) of the 2'nd order IIR filters are n in which n=0, 1, ..., N−1. However, the indices of the outputs I1(n) and Q1(n) with respect to the same inputs are n in which n=n1, n1+1, ..., N−1, and the indices of the outputs I2(n) and Q2(n) having passed through the downstream 2'nd order IIR filters are n in which n=n2, n2+1, ..., N−1. Here, n2 is equal to or greater than n1. In conclusion, as the number of the initial output data, that is, n1 and n2 are increased, the effect of the transient response with respect to the clutter signal can be reduced.

However, although the above method can effectively reduce the effect of the transient response with respect to the clutter signal, the number of data input to the auto-correlation estimator and used for the blood stream velocity calculation is reduced, which causes a reliable blood stream velocity and the relevant information not to be obtained.

SUMMARY OF THE INVENTION

To solve the above problems, it is an object of the present invention to provide an ultrasonic color flow mapping system and a filtering method for filtering an ultrasonic Doppler signal, in which a transient response with respect to a clutter signal included in the ultrasonic Doppler signal can be minimized, a reliable power and average frequency of the ultrasonic Doppler signal can be calculated since the number of data input to an auto-correlation estimator is not reduced, and thus an image such as a blood stream velocity can be accurately displayed on a real time basis.

To accomplish the above object of the present invention, there is provided an ultrasonic color flow mapping system for regenerating an ultrasonic Doppler signal as an image, the ultrasonic color flow mapping system comprising: a forward processing portion for excluding initial output data up to a predetermined number from outputs based on an ultrasonic Doppler signal input having a predetermined index sequence; a backward processing portion for excluding initial output data up to a predetermined number from outputs based on the ultrasonic Doppler signal input having a backward index sequence with respect to the input of the forward processing portion; and an operator for calculating a power and an average frequency of the ultrasonic Doppler signal based on the outputs of the forward and backward processing portions and providing the calculated result as an output for image regeneration.

Here, each of the forward processing portion and the backward processing portion comprises a filter portion having a plurality of infinite impulse response filters, for excluding the initial output data up to the predetermined number from the outputs from the upstream; and an auto-correlation estimator for auto-correlating the outputs from the filter portion and outputting the auto-correlation result to the operator.

Here, the operator comprises a plurality of subtracters/adders for adding the corresponding data to each other among the auto-correlation outputs from the respective auto-correlation estimators.

According to the other aspect of the present invention, there is provided a filtering method for regenerating an ultrasonic Doppler signal as an image, the filtering method comprising the steps of: excluding initial output data up to a predetermined number from outputs based on an ultrasonic Doppler signal input having a predetermined index sequence; excluding initial output data up to a predetermined number from outputs based on the ultrasonic Doppler signal input having a backward index sequence with respect to the input of the forward processing portion; and calculating a power and an average frequency of the ultrasonic Doppler signal based on the outputs of the forward and backward excluding steps and providing the calculated result as an output for image regeneration.

DETAILED DESCRIPTION OF THE INVENTION

A preferred embodiment of the present invention will be described with reference to the accompanying drawing.

Figure 1:
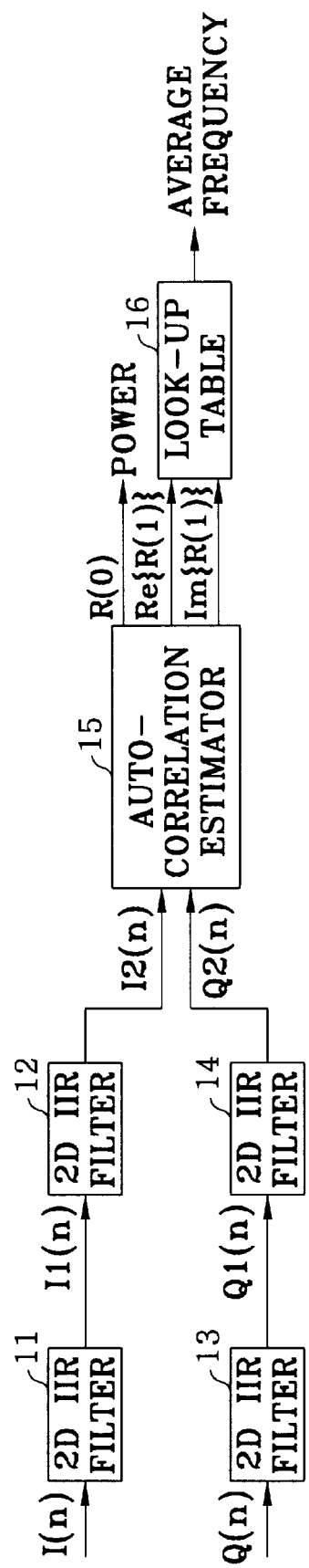
FIG. 1 is a block diagram showing a conventional ultrasonic color flow mapping system.
Figure 2:
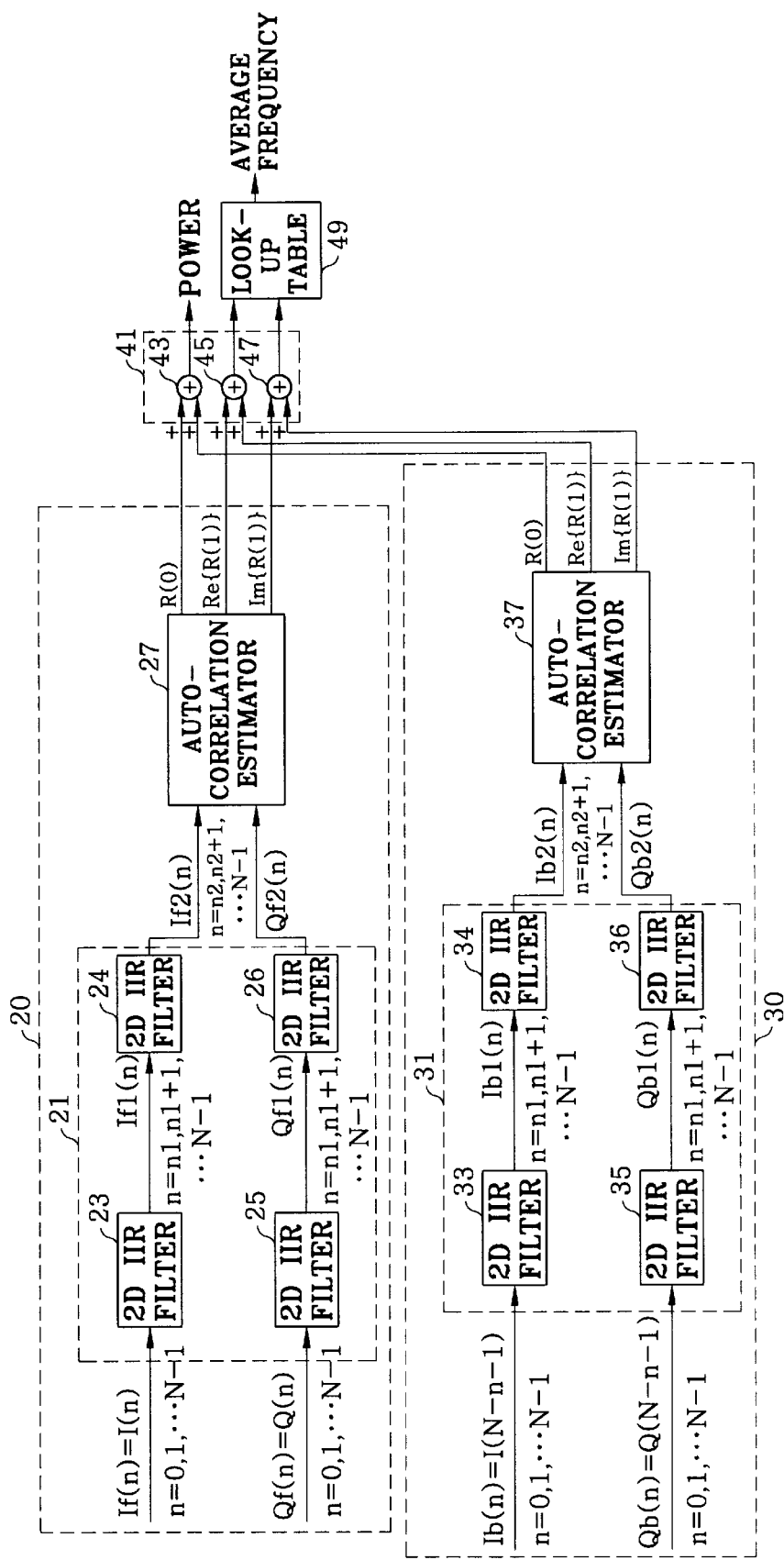
FIG. 2 is a block diagram showing an ultrasonic color flow mapping system according to the present invention.

Referring to FIG. 2, an ultrasonic color flow mapping system includes a forward processing portion 20, a backward processing portion 30 and an operator 41 for operating outputs from respective auto-correlation estimators 27 and 37 in the forward and backward processing portions 20 and 30 and calculating a power and an average frequency of an ultrasonic Doppler signal. The operator 41 includes adders 43 and 45, a subtracter 47 and a look-up table 49. The forward processing portion 20 and the backward processing portion 30 includes filter portions 21 and 31 each having four 2'nd order IIR filters 23 through 26 and 33 through 36, and auto-correlation estimators 27 and 37, respectively.

In the same manner as described in the conventional art, the forward processing portion 20 processes an ultrasonic Doppler color signal. In more detail, the indices of the outputs I1(n) and Q1(n) with respect to the indices (n=0, 1, ..., N−1) of the inputs I(n) and Q(n) of first and third 2'nd order IIR filters 23 and 25 are n in which n=n1, n1+1, ..., N−1. However, the indices of the outputs I2(n) and Q2(n) having passed through second and fourth 2'nd order IIR filters 24 and 26 are n in which n=n2, n2+1, ..., N−1. Here, If(n) and Qf(n) are same as the inputs I(n) and Q(n) of the conventional art. Also, the indices of the inputs If1(n) and Qf1(n) of the second and fourth 2'nd order IIR filters 24 and 26 are n in which n=n1, n1+1, ..., N−1, and the indices of the inputs If2(n) and Qf2(n) of the auto-correlation estimator 27 are n in which n=n2, n2+1, ..., N−1, which do not start from zero, respectively. This means that several initial output data is excluded under the assumption that several initial output data has a particularly large transient response among the output data filtered by the first and third IIR filters 23 and 25 in the forward processing portion 20. Here, n2 is equal to or larger than n1, which are determined as experimental relevant values according to filter coefficients or system conditions. As the number of the excluded initial output data, that is, n1 and n2 are increased, an effect of the transient response with respect to the clutter signal is reduced.

Although the effect of the transient response with respect to the clutter signal can be reduced in the forward processing portion 20, the number of the data input from the filter portion 21 to the auto-correlation estimator 27 and used for blood stream velocity calculation is reduced. Thus, the power and average frequency of the ultrasonic Doppler signal cannot be accurately detected with only the forward processing portion 20.

To solve this problem, the present invention includes a backward processing portion 30 having another filter portion 31 and another auto-correlation estimator 37 as shown in FIG. 2. The backward processing portion 30 receives inputs I(N−n−1) and Q(N−n−1) each having a backward sequence with respect to the inputs I(n) and Q(n) of the forward processing portion 20. The signal processing of the backward processing portion 30 is performed using the inputs I(N−n−1) and Q(N−n−1) each having the backward sequence, in the same manner as that of the forward processing portion 20.

According to this method, the backward processing portion 30 excludes several data which can reduce the effect of the transient response with respect to the clutter signal among the inputs to the auto-correlation estimator 37, that is, the outputs filtered by second and fourth 2'nd order IIR filters 34 and 36. Here, the number of the data input to the auto-correlation estimator 37 and used for calculating the blood stream velocity is reduced and as a result the power and average frequency of the ultrasonic Doppler signal cannot be accurately detected in itself.

Meanwhile, the outputs of the respective processing portions 20 and 30, that is, the auto-correlation outputs of the auto-correlation estimators 27 and 37 are added to each other in the operator 41 or subtracted from each other. Here, the auto-correlations R(O)s from the auto-correlation estimators 27 and 37 are added to each other in a first adder 43 and then is used for calculating the power of the Doppler signal. The auto-correlations Re(R(l))s from the auto-correlation estimators 27 and 37 are added to each other in a second adder 45 and the auto-correlations Im(R(1))s from the auto-correlation estimators 27 and 37 are added to each other in a first subtracter 47. Here, the signs of the auto-correlations Im(R(1)) output from the auto-correlation estimators 27 and 37 reverse to each other. As a result, the first subtracter 47 performs a subtraction operation, by which the substantially same result as an addition operation is obtained. The output having passed through the look-up table 49 after being added in the second adder 45 and subtracted in the first subtracter 47 is used for calculating the average frequency of the Doppler signal.

As described above, according to the ultrasonic color flow mapping system and the filtering method for filtering the ultrasonic Doppler signal, as the number of the initial output data which has been filtered by the IIR filters 23, 24, 25, 33, 34, 35 and 36 and excluded in the respective processing portion 20 and 30, that is, n1 and n2 are increased to a degree, e. g., about N/2 or so, an effect of the transient response with respect to the clutter signal is gradually reduced and thus the outputs of the auto-correlation estimators 27 and 37 become more independent. Here, when the outputs of the auto-correlation estimators 27 and 37 are added to each other or subtracted from each other, the same effect as when no data is not excluded in the processing portions 20 and 30 can be obtained. Conclusively, since no data is not excluded in the ultrasonic color flow mapping system, the power and average frequency of the ultrasonic Doppler signal can be accurately calculated on the basis of a relatively more number of data. As a result, an image such as a blood stream velocity can be accurately regenerated on a real time basis.

Meanwhile, in the system according to the present invention, it is preferable to include a signal conversion portion(not shown) for converting the input signal to inputs I(N−n−1) and Q(N−n−1), and for providing them to the backward processing portion 30. Further, it is preferable to provide a synchronous portion(not shown) ahead of the forward processing portion 20 so as to synchronize the forward signal inputted to the forward processing portion 20 with the backward signal inputted to the backward prdcessing portion 30.

What is claimed is:

1. An ultrasonic color flow mapping system for regenerating an ultrasonic Doppler signal as an image, the ultrasonic color flow mapping system comprising:

a forward processing portion for excluding initial output data up to a predetermined number from outputs based on an ultrasonic Doppler signal input having a predetermined index sequence;

a backward processing portion for excluding initial output data up to a predetermined number from outputs based on the ultrasonic Doppler signal input having a backward index sequence with respect to the input of the forward processing portion;

an operator for calculating a power and an average frequency of the ultrasonic Doppler signal based on the outputs of the forward and backward processing portions and providing the calculated result as an output for image regeneration, wherein said forward and backward processing portions each comprise:

a filter portion having a plurality of infinite impulse response filters, for excluding the initial output data up to the predetermined number, and an autocorrelation estimator for autocorrelating outputs from said filter portion, and wherein said operator comprises a plurality of subtracters and adders for subtracting and adding respectively outputs from said autocorrelation estimator to determine the power and the average frequency of the ultrasonic Doppler signal.

2. The ultrasonic color flow mapping system according to claim 1, wherein said autocorrelation estimator outputs auto-correlation results to the operator according to the following equations, $$R(0) = \sum_{n=0}^{N-1} (I2(n) \cdot I2(n) + Q2(n) \cdot Q2(n))$$

$$\text{Re}(R(1)) = \sum_{n=0}^{N-2} (I2(n) \cdot I2(n+1) + Q2(n) \cdot Q2(n+1))$$

$$\text{Im}(R(1)) = \sum_{n=0}^{N-2} (I2(n) \cdot Q2(n+1) - Q2(n) \cdot I2(n+1)).$$

3. The ultrasonic color flow mapping system according to claim 2, wherein said operator comprises a plurality of subtracters/adders for adding the corresponding data to each other among the auto-correlation outputs from the respective auto-correlation estimators.

4. The ultrasonic color flow mapping system according to claim 2, wherein said plurality of adders/subtracters comprise:

a first adder for adding the auto-correlations R(0)s among the auto-correlation outputs of the equations to each other;

a second adder for adding the auto-correlations Re(R(1))s among the auto-correlation outputs of the equations to each other; and a first subtracter for subtracting the auto-correlations Im(R(1))s among the auto-correlation outputs of the equations from each other.

5. The ultrasonic color flow mapping system according to claim 4, wherein the output from said first adder is used for calculating the power of the ultrasonic Doppler signal, and the outputs from said second adder and said first subtracter are used for calculating the average frequency of the ultrasonic Doppler signal.

6. The ultrasonic color flow mapping system according to claim 1, wherein said ultrasonic Doppler signal is a signal reflected from a living body.

7. A filtering method for regenerating an ultrasonic Doppler signal as an image, the filtering method comprising the steps of:

excluding initial output data up to a predetermined number from outputs based on an ultrasonic Doppler signal input having a predetermined index sequence;

excluding initial output data up to a predetermined number from outputs based on the ultrasonic Doppler signal input having a backward index sequence with respect to the predetermined index sequence;

calculating a power and an average frequency of the ultrasonic Doppler signal based on the outputs of the excluding steps and providing the calculated result as an output for image regeneration, wherein said excluding steps each comprise the step of: autocorrelating portions of the initial output data that are not excluded, and wherein said calculating step comprises the steps of: adding and subtracting autocorrelated outputs of said excluding steps to determine the power and the average frequency of the ultrasonic Doppler signal.

8. An ultrasonic color flow mapping system for regenerating an ultrasonic Doppler signal as an image, the ultrasonic color flow mapping system comprising:

a forward and a backward processing portion for excluding initial output data up to a predetermined number of outputs based on a first and a second predetermined index sequence, respectively, the second sequence being in a reverse order with respect to the first sequence, the sequences corresponding to an ultrasonic Doppler signal input; and an operator for calculating a power and an average frequency of the ultrasonic Doppler signal input based on outputs of said forward and backward processing portions and providing a calculated result as an output for image regeneration, wherein said forward and backward processing portions each comprise:

a filter portion for removing a low frequency component of the initial output data; and an autocorrelation estimator for autocorrelating outputs from said filter portion, and wherein said operator comprises a plurality of subtracters and adders for subtracting and adding, respectively, outputs from said autocorrelation estimator to determine the power and the average frequency of the ultrasonic Doppler signal.

9. The ultrasonic color flow mapping system according to claim 8, wherein said autocorrelation estimator outputs auto-correlation results to the operator according to the following equations, $$R(0) = \sum_{n=0}^{N-1} (I2(n) \cdot I2(n) + Q2(n) \cdot Q2(n))$$

$$\text{Re}(R(1)) = \sum_{n=0}^{N-2} (I2(n) \cdot I2(n+1) + Q2(n) \cdot Q2(n+1))$$

$$\text{Im}(R(1)) = \sum_{n=0}^{N-2} (I2(n) \cdot Q2(n+1) - Q2(n) \cdot I2(n+1)).$$

* * * * *